United States Patent
Agbley et al.

(10) Patent No.: US 12,458,583 B2
(45) Date of Patent: Nov. 4, 2025

(54) PERSONAL CARE COMPOSITIONS

(71) Applicant: Colgate-Palmolive Company, New York, NY (US)

(72) Inventors: Esinam Kuma Agbley, Somerset, NJ (US); Arturo Zuniga, Mexico City (MX)

(73) Assignee: Colgate-Palmolive Company, New York, NY (US)

( * ) Notice: Subject to any disclaimer, the term of this patent is extended or adjusted under 35 U.S.C. 154(b) by 473 days.

(21) Appl. No.: 17/996,542

(22) PCT Filed: Apr. 27, 2021

(86) PCT No.: PCT/US2021/029427
§ 371 (c)(1),
(2) Date: Oct. 19, 2022

(87) PCT Pub. No.: WO2021/222270
PCT Pub. Date: Nov. 4, 2021

(65) Prior Publication Data
US 2023/0172834 A1      Jun. 8, 2023

Related U.S. Application Data

(60) Provisional application No. 63/018,742, filed on May 1, 2020.

(51) Int. Cl.
| | |
|---|---|
| *A61K 8/39* | (2006.01) |
| *A61K 8/44* | (2006.01) |
| *A61K 8/46* | (2006.01) |
| *A61K 8/73* | (2006.01) |
| *A61K 8/81* | (2006.01) |
| *A61Q 5/02* | (2006.01) |
| *A61Q 5/12* | (2006.01) |

(52) U.S. Cl.
CPC .............. *A61K 8/737* (2013.01); *A61K 8/463* (2013.01); *A61K 8/817* (2013.01); *A61Q 5/02* (2013.01); *A61Q 5/12* (2013.01)

(58) Field of Classification Search
None
See application file for complete search history.

(56) References Cited

U.S. PATENT DOCUMENTS

| | | | | |
|---|---|---|---|---|
| 6,489,286 | B1 * | 12/2002 | Lukenbach | ............. A61Q 5/02 510/475 |
| 2017/0014324 | A1 * | 1/2017 | Yamasaki | ................ A61Q 5/02 |
| 2017/0367955 | A1 | 12/2017 | Brown et al. | |

FOREIGN PATENT DOCUMENTS

| | | |
|---|---|---|
| JP | 2017137254 | 8/2017 |
| JP | 2017155034 | 9/2017 |
| JP | 2018008891 | 1/2018 |
| WO | 2017/167579 | 10/2017 |

OTHER PUBLICATIONS

Anonymous, 2018, "Refreshing Anti-Dandruff Shampoo", Mintel Database GNPD AN: 5431771.
Anonymous, 2019, "Shampoo with Pure Grapefruit + Rosemary Oil", Mintel Database GNPD AN: 6690971.
International Search Report and the Written Opinion of the International Searching Authority issued in International Application PCT/US2021/029427 mailed Sep. 24, 2021.
Kao Corporation, S.A., Technical Data Sheet for KAO SOFCARE GP-1, Aug. 2, 2013, pp. 1-2.
Machine Translation JP2017137254.
Machine Translation JP2017155034.
Machine Translation JP2018008891.

* cited by examiner

*Primary Examiner* — Brian Gulledge

(57) ABSTRACT

Described herein are personal care compositions that include a surfactant system which comprises an anionic ether sulfate and an amphoteric surfactant; and a conditioning system which comprises a cationic guar gum and a polypropylene alkyl ether. Also described are methods of making and using the same.

20 Claims, 4 Drawing Sheets

PERSONAL CARE COMPOSITIONS

BACKGROUND

Human hair requires cleaning, since the hair fibers become soiled, both from environmental contamination as well as contamination from chemical agents produced by the body. Generally, shampooing is employed to clean the hair by removing excess soil and body oils which have built up onto the hair fibers. Unfortunately, while being capable of cleaning the hair fibers, shampoos generally also leave the hair stripped of moisture, over-processed and difficult to manage.

Hair conditioners deliver a number of desirable characteristics to hair which complement the utility of shampoo, including an improved wet or dry feel and a perception of softness.

Consumers are increasingly looking for shampoo products that provide more than cleansing of the hair fibers. In particular, consumers often desire cleansing that does not result in unmanageable hair. Thus, shampoos have been developed which simultaneously clean and condition the hair. However, in order to secure high consumer acceptance of any shampoo composition, it is essential to provide consumer-desirable product aesthetics, such as a clear composition, which does not compromise in product performance. A general challenge to such cleansing and conditioning shampoo compositions is that clear compositions are generally poor conditioners.

Therefore, there remains a need for clear hair care compositions that impart a wide range of desired performance characteristics.

In some aspects, the present invention solves these previous technical problems by providing new and improved compositions. More particularly, the present invention relates to personal care compositions for cleansing and conditioning human hair.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The present invention is directed to personal care compositions comprising: a surfactant system which comprises an anionic ether sulfate and an amphoteric surfactant; and a conditioning system which comprises a cationic guar gum and a polypropylene alkyl ether.

In certain embodiments, the anionic ether sulfate is defined by the formula: $R(OC_2H_4)nOSO_3M$; wherein R is an alkyl, alkylaryl, acyl, or alkenyl group having 8 to 18 carbon atoms; n is 1 to 12, or 1 to 5; and M is a solubilizing cation selected from sodium, potassium, ammonium, magnesium and mono-, di- and triethanol ammonium ions. In further embodiments, the anionic ether sulfate is selected from sodium laureth sulfate, sodium lauryl sulfate, ammonium lauryl sulfate, and a combination of two or more thereof. In certain embodiments, the anionic ether sulfate comprises sodium laureth sulfate. In certain embodiments, the anionic ether sulfate is present in an amount between about 10% to about 20%, about 12% to about 18%, about 12% to about 16%, about 14%, or about 15%, by weight of the personal care composition.

In certain embodiments, the amphoteric surfactant is selected from: $C_{12-14}$ alkyl betaine; $C_{12-18}$ alkyl betaine; $C_{14-15}$ hydroxysulfo betaine; cocoamidopropyl betaine; cocoamidopropyl sultaine; lauroamphoglycinate; dihydroxyethyl tallow glycinate; isostearoamphopropionate; dodecyl betaine; tetradecyl betaine; hexadecyl betaine; sodium acylamphopropionate; disodium acyldiamphopropionate; sodium lauroamphoacetate; cocoamphodiacetate; $C_{12-18}$ alkylampho propionate; $C_{12}$ alkyliminodipropionate; and a combination of two or more thereof. In certain embodiments, the amphoteric surfactant comprises cocamidopropyl betaine. In certain embodiments, the amphoteric surfactant is present in an amount between about 1% to about 10%, about 2% to about 8%, about 2% to about 5%, or about 2% to about 4%, by weight of the personal care composition.

In certain embodiments, the surfactant system is present in an amount between about 11% to about 22%, about 13% to about 20%, or about 15% to about 18%, by weight of the personal care composition.

In certain embodiments, the cationic guar gum is derivatized with a quaternary ammonium group defined by the formula:

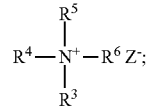

wherein $R^3$, $R^4$ and $R^5$ are selected from hydrogen, alkyl, hydroxyalkyl, epoxy alkyl, alkenyl, or aryl; $R^6$ is either an epoxyalkyl group of the general formula:

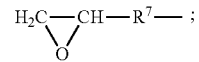

or $R^6$ is a halohydrin group of the general formula:

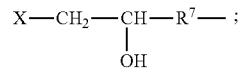

wherein $R^7$ is a $C_{1-3}$ alkylene; X is chlorine or bromine, and Z is an anion such as Cl—, Br—, I— or $HSO_4$—. In certain embodiments, the cationic guar gum is derivatized with hydroxy alkyl, carboxyalkyl, or combinations thereof. In certain embodiments, the cationic guar gum is utilized with counterions selected from a halide, sulfate, methylsulfate, and mixtures thereof. In certain embodiments, the cationic guar gum is hydroxypropyl guar hydroxypropyltrimonium chloride. In certain embodiments, the cationic guar gum is present in an amount between about 0.05% to about 5%, about 0.05% to about 3%, about 0.1% to about 2%, or about 0.1% to about 1%, by weight of the personal care composition.

In certain embodiments, the polypropylene alkyl ether is defined by the formula: $C_nH_{2n+1}[OCH(CH_3)CH_2]_xOH$; wherein n is an integer from 1 to 12; and X is an integer from 2 to 40. In certain embodiments, n is an integer between 4 to 8. In certain embodiments, n is 8 and X is between 2 to 4. In certain embodiments, the polypropylene alkyl ether is PPG-3 caprylyl ether. In certain embodiments, the polypropylene alkyl ether is present in an amount between about 0.05% to about 5%, about 0.05% to about 3%, about 0.1% to about 2%, or about 0.1% to about 1%, by weight of the personal care composition.

In certain embodiments, the conditioning system is present in an amount between about 0.1% to about 5%, about 0.1% to about 3%, about 0.1% to about 2%, or about 0.1% to about 1%, by weight of the personal care composition.

In certain embodiments, the composition is in the form of a shampoo.

In certain embodiments, the personal care composition further comprises polyquaternium-7. In certain embodiments, the polyquaternium-7 is present in an amount of between about 0.1% to about 5%, about 1% to about 5%, about 1% to about 4%, or about 1% to about 3%, by weight of the personal care composition.

In certain embodiments, the personal care composition has a turbidity of between about 5 to about 15 NTU, about 5 to about 10 NTU, or about 6 to about 12 NTU.

In other embodiments, the present invention is directed to a method of treating, preventing or ameliorating a symptom associated with a disease, disorder or condition of a keratinous substance, comprising applying a personal care composition according to any one of the foregoing embodiments to a keratinous substance of a subject in need thereof.

In other embodiments, the present invention is directed to a method of cleansing a keratinous substance comprising applying a personal care composition according to any one of the foregoing claims to a keratinous substance of a subject in need thereof.

In certain embodiments of any method described herein, the keratinous substance is hair. In certain embodiments of any method described herein, the method further comprises rinsing the personal care composition from the keratinous substance to which it is applied.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Figure 1:
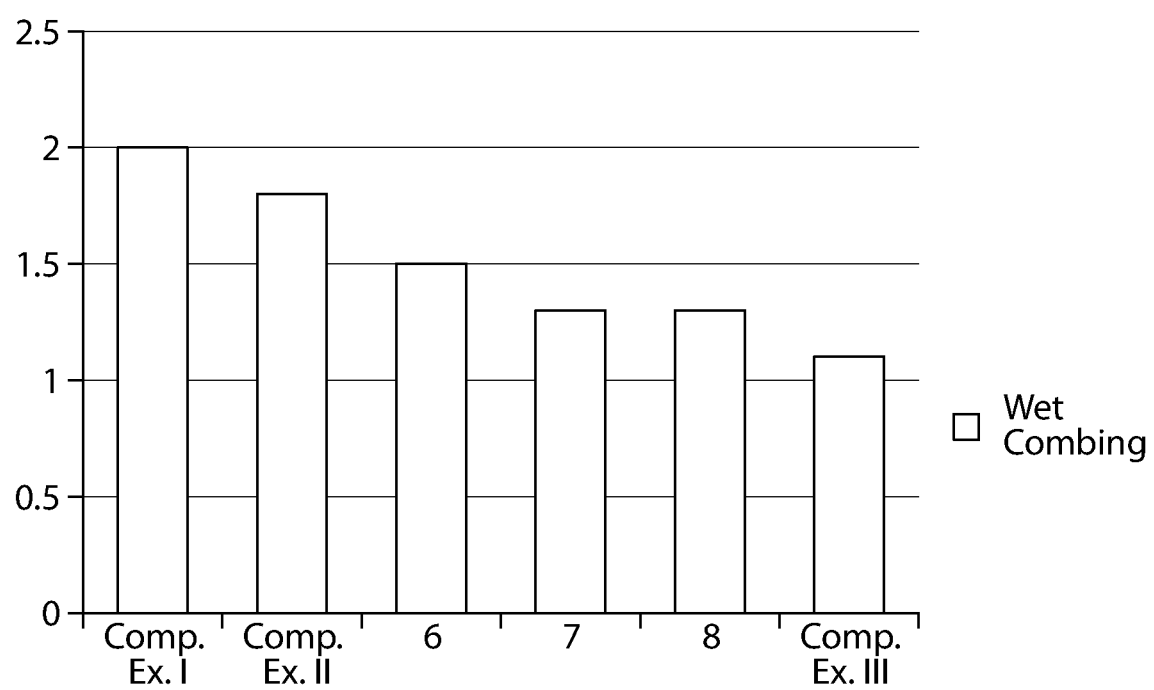
FIG. 1 depicts the performance on wet combing for compositions of the invention compared to comparative examples.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight. According to the present application, the term "about" means+/−5% of the reference value. As used herein, the term "substantially free" is intended to mean an amount less than about 1 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

The present invention relates to a composition and method of treating hair. More particularly, the present invention relates to a method of treating the hair, whereby the hair is cleansed and conditioned by contacting the hair with a personal care composition (also referred to as a shampoo composition) of the invention. The clear, easy-to-apply composition is esthetically pleasing for consumer acceptance and, surprisingly and unexpectedly, hair treated with the shampoo composition of the present invention also demonstrates improved effects on the hair, such as wet and dry feel and combability, softness, and excellent hair alignment.

In the context of this invention, the personal care composition provides a conditioning effect to hair treated with the shampoo composition. The term "conditioning" is to be understood for purposes of this invention as imparting positive properties to the hair, for example improved softness, enhanced shine and color brilliance, consistent hair alignment, ease of wet combing and ease of dry combing.

The personal care composition of the present invention comprises a surfactant system and a conditioning system. The surfactant system comprises an anionic ether sulfate and an amphoteric surfactant. The surfactant system is typically present in an amount between about 11% to about 22%, about 13% to about 20%, or about 15% to about 18%, by weight of the personal care composition. The conditioning system comprises a cationic guar gum and a propylene alkyl ether. The conditioning system is typically present in an amount between about 0.1% to about 5%, about 0.1% to about 3%, about 0.1% to about 2%, or about 0.1% to about 1%, by weight of the personal care composition.

In certain embodiments, the anionic ether sulfate is defined by the formula: $R(OC_2H_4)nOSO_3M$; wherein R is an alkyl, alkylaryl, acyl, or alkenyl group having 8 to 18 carbon atoms; n is 1 to 12, or 1 to 5; and M is a solubilizing cation selected from sodium, potassium, ammonium, magnesium and mono-, di- and triethanol ammonium ions. In certain embodiments, the anionic ether sulfate is selected from sodium laureth sulfate, sodium lauryl sulfate, ammonium lauryl sulfate, and a combination of two or more thereof. In certain embodiments, the anionic ether sulfate comprises sodium laureth sulfate. In certain embodiments, the anionic ether sulfate is present in an amount between about 10% to about 20%, about 12% to about 18%, about 12% to about 16%, about 14%, or about 15%, by weight of the personal care composition.

In some embodiments, the amphoteric surfactant is selected from: $C_{12-14}$ alkyl betaine; $C_{12-18}$ alkyl betaine; $C_{14-15}$ hydroxysulfo betaine; cocoamidopropyl betaine; cocoamidopropyl sultaine; lauroamphoglycinate; dihydroxyethyl tallow glycinate; isostearoamphopropionate; dodecyl betaine; tetradecyl betaine; hexadecyl betaine; sodium acylamphopropionate; disodium acyldiamphopropionate; sodium lauroamphoacetate; cocoamphodiacetate; $C_{12-18}$ alkylampho propionate; $C_{12}$ alkyliminodipropionate; and a combination of two or more thereof. In further embodiments, the amphoteric surfactant comprises cocamidopropyl betaine. In certain embodiments, the amphoteric surfactant is present in an amount between about 1% to about 10%, about 2% to about 8%, about 2% to about 5%, or about 2% to about 4%, by weight of the personal care composition.

In a non-limiting embodiment, the cationic guar gum may be polysaccharides composed of the sugars galactose and mannose. In such embodiments, the backbone is a linear chain of β 1,4-linked mannose residues to which galactose residues are 1,6-linked at every second mannose, forming short side-branches. The guar gum may be derivatized by attaching a quaternary ammonium group bearing three radicals, which may be identical or different, preferably chosen from hydrogen, alkyl, hydroxyalkyl, epoxy alkyl, alkenyl, or aryl, preferably containing 1 to 22 carbon atoms, more particularly 1 to 14 and advantageously 1 to 3 carbon atoms.

The cationic guar polymer may be formed from quaternary ammonium compounds. In an embodiment, the quaternary ammonium compounds for forming the cationic guar polymer conform to Formula 1:

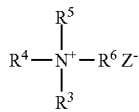

wherein $R^3$, $R^4$ and $R^5$ are selected from hydrogen, alkyl, hydroxyalkyl, epoxy alkyl, alkenyl, or aryl; $R^6$ is either an epoxyalkyl group of the general formula 2:

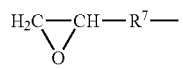

or $R^6$ is a halohydrin group of the general formula 3:

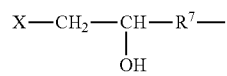

wherein $R^7$ is a $C_{1-3}$ alkylene; X is chlorine or bromine, and Z is an anion such as Cl—, Br—, I— or HSO4-.

In certain embodiments, the cationic guar polymer conforms to the general formula 4:

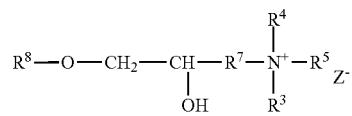

wherein $R^8$ is guar gum or is guar gum derivatized with a $C_{1-4}$ alcohol; and wherein $R^4$, $R^5$, $R^6$ and $R^7$ are as defined above; and wherein Z is a halogen. In one embodiment, the cationic guar polymer conforms to Formula 5:

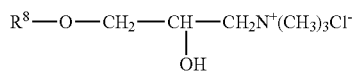

Suitable cationic guar gums include cationic guar gum derivatives, such as guar hydroxypropyltrimonium. In an embodiment, the cationic guar gum is guar hydroxypropyltrimonium chloride. Specific examples of guar hydroxypropyltrimonium chlorides include the Jaguar® series commercially available from DeWolf Chemical, such as Jaguar® C-162, or Rhone-Poulenc Incorporated, for example Jaguar® C-17, Jaguar® C 13S, N-Hance™ 3196, N-Hance™ BF-13, which is a borate (boron) free guar (Ashland), and N-Hance™ BF-17, which is also a borate (boron) free guar (Ashland Specialty Chemical).

In certain preferred embodiments, the guar portion of the cationic guar gum derivative molecules described above may be further modified by derivatization. Useful guar portion derivatives include, but are not limited to, hydroxyalkyl guars, such as hydroxyethyl guar (HE guar), hydroxypropyl guar (HP guar), hydroxybutyl guar (HB guar), and carboxylalkyl guars including carboxymethyl guar (CM guar), alkylcarboxy guars such as carboxylpropyl guar (CP guar) and carboxybutyl guar (CB guar), and carboxymethyl hydroxypropyl guar (CMHP guar). In certain embodiments, the guar hydroxypropyltrimonium derivatives described above are further derivatized with a $C_{1-4}$ hydroxyalkyl on the guar portion of the molecule. In certain embodiments, the cationic guar gum is hydroxypropyl guar hydroxypropyltrimonium chloride, available as, for example, Jaguar® C-162 (DeWolf).

In some embodiments, the cationic guar may be coupled with a counter ion. Various counter ions can be utilized, including but not limited to halides, such as chloride, fluoride, bromide, and iodide, sulfate, methylsulfate, and mixtures thereof. The counterion is generally a halogen, which is chlorine.

The cationic guar may be present in an amount ranging from about 0.05 wt. % to about 5.0 wt. % based on the total weight of the personal care composition. In some embodiments, the cationic guar is present in an amount between about 0.05% to about 5%, about 0.05% to about 3%, about 0.1% to about 2%, or about 0.1% to about 1%, by weight of the personal care composition.

Some embodiments provide a nonionic conditioner. In some embodiments, the nonionic conditioner comprises a polypropylene alkyl ether. In certain embodiments, the polypropylene alkyl ether is defined by the formula: $C_nH_{2n+1}[OCH(CH_3)CH_2]_XOH$; wherein n is an integer from 1 to 12; and X is an integer from 2 to 40. In certain embodiments, n is an integer between 4 to 8. In certain embodiments, n is 8 and X is between 2 to 4. In certain embodiments, the polypropylene alkyl ether is PPG-3 caprylyl ether. In certain embodiments, the polypropylene alkyl ether is present in an amount between about 0.05% to about 5%, about 0.05% to about 3%, about 0.1% to about 2%, or about 0.1% to about 1%, by weight of the personal care composition.

In some embodiments, preservatives are included in the present personal care compositions, preferably at a concentration of about 0.01 wt % to about 10 wt %, about 0.01 wt % to 3 wt %, or 0.01 wt % to 2.5 wt %. Examples of preservatives include, but are not limited to, benzalkonium chloride; sodium benzoate, sodium salicylate; benzethonium chloride, 5-bromo-5-nitro-1,3dioxane; 2-bromo-2-nitropropane-1,3-diol; alkyl trimethyl ammonium bromide; N-(hydroxymethyl)-N-(1,3-dihydroxy methyl-2,5-dioxo-4-imidaxolidinyl-N-(hydroxy methyl)urea; 1-3-dimethyol-5,5-dimethyl hydantoin; formaldehyde; iodopropynl butyl carbamate, butyl paraben; ethyl paraben; methyl paraben; propyl paraben, mixture of methyl isothiazolinone/methylchloroisothiazoline in a 1:3 wt. ratio; mixture of phenoxyethanol/butyl paraben/methyl paraben/propylparaben; 2-phenoxyethanol; tris-hydroxyethyl-hexahydrotriazine; methylisothiazolinone; 5-chloro-2-methyl-4-isothiazolin-3-one; 1,2-dibromo-2,4-dicyanobutane; 1-(3-chloroalkyl)-3,5, 7-triaza-azoniaadamantane chloride; organic acids, lactic acid, or citric acid and combinations thereof.

Compositions of the invention utilize a carrier. The carrier may comprise water. The water may be soft water. The term "soft water" refers to water having a low concentration of ions, specifically, calcium and magnesium ions. For example, soft water is water having less than about 60 mg/l calcium carbonate, preferably less than 50 mg/l of calcium carbonate. The carrier may comprise 100 wt. % of water—specifically soft water. In other embodiments, the carrier may be predominantly water—i.e., greater than 50 wt. % water, based on the total weight of the carrier, with the remaining amounts being one or more suitable non-aqueous solvents.

The carrier may be present in an amount ranging from 70.0 wt. % to about 90.0 wt. %—including all amounts and sub-ranges there-between—based on the total weight of the personal care composition. In some embodiments, the carrier component may be present in an amount ranging from about 75 wt. % to about 85 wt. %—including all amounts and sub-ranges there-between—based on the total weight of the personal care composition. In some embodiments directed to improved smoothness, the carrier may be present in an amount of about 81 wt. % to about 83 wt. % based on the total weight of the personal care composition. In some embodiments directed to improved foaming, the carrier may be present in an amount of about 79 wt. % to about 81 wt. % based on the total weight of the personal care composition.

The composition of the present invention may further comprise one or more thickeners. The thickener may be included to improve composition esthetics and facilitate application of the conditioner composition to the hair. The thickener may be nonionic. The thickener may be present in an amount ranging from about 0.1 wt. % to about 0.5 wt. % based on the total weight of the conditioner composition. In some embodiments, the thickener may be present in an amount ranging from about 0.1 wt. % to about 0.3 wt. % based on the total weight of the conditioner composition. The thickener may be present in an amount of about 0.2 wt. % based on the total weight of the conditioner composition.

The thickener may include water-soluble polymers and are generally water-soluble macromolecular structures having both hydrophilic and hydrophobic components. The associative polymers can thicken compositions as a result of intermolecular association between the various water-insoluble hydrophobic components which form a part of or bonded to (directly or indirectly) a water-soluble polymer backbone.

Non-limiting associative polymers suitable as a thickener may include, but are not limited to, hydrophobically modified hydroxyalkyl cellulose polymers such as hydrophobically modified hydroxyethyl cellulose (HMHEC), hydrophobically modified alkoxylated urethane polymers, such as hydrophobically modified ethoxylated urethane (HEUR), and hydrophobically modified nonionic polyols. Preferred for use herein are hydrophobically modified hydroxyalkyl cellulose polymers and mixtures thereof. In a preferred embodiment, the thickener may be cetyl hydroxyethyl cellulose.

The personal care composition may comprise one or more lipid materials. The lipid materials are essentially water-insoluble and contain hydrophobic and hydrophilic moieties. The overall amount of lipid material may range from about 0.5 wt. % to about 6 wt. %—including all amounts and subranges there-between. Lipid materials useful herein include naturally or synthetically derived acids, acid derivatives, alcohols, esters, ethers, ketones, and amides having carbon chains of from 12 to 22, preferably from 16 to 18, carbon atoms in length. Fatty alcohols and fatty esters are preferred; fatty alcohols are particularly preferred.

Fatty alcohols included among those useful herein are disclosed in the following documents, all incorporated by reference herein: U.S. Pat. Nos. 3,155,591; 4,165,369; and 4,269,824, each of which are incorporated by reference in their entireties. Fatty esters included among those useful herein are disclosed in U.S. Pat. No. 3,341,465, hereby incorporated by reference in its entirety herein. Preferred esters for use herein include cetyl palmitate and glycerol monostearate. Cetyl alcohol and stearyl alcohol are preferred alcohols. A particularly preferred lipid material is comprised of a mixture of stearyl alcohol and cetyl alcohol in a weight ratio ranging from about 50:50 to about 70:30—including all ratios and sub-ranges there-between.

The ester-containing lipid, for example the glyceryl monostearate, may be present in an amount ranging from may be present in an amount ranging from about 0.1 to about 1.5 wt. % based on the total weight of the personal care composition—including all percentages and sub-ranges there-between. In a preferred embodiment, the ester-containing lipid, for example the glyceryl monostearate, may be present in an amount ranging from may be present in an amount ranging from about 0.5 to about 1.0 wt. % based on the total weight of the personal care composition—including all percentages and sub-ranges there-between. In some embodiments directed to improved smoothness, the ester-containing lipid is present in an amount of about 0.5 wt. % based on the total weight of the personal care composition. In some embodiments directed to improved foaming, the ester-containing lipid is present in an amount of about 1.0 wt. % based on the total weight of the personal care composition.

The alcohol-containing lipid, for example the blend of stearyl alcohol and cetyl alcohol, may be present in an amount ranging from about 3.0 to about 6.0 wt. % based on the total weight of the personal care composition—including all amounts and sub-ranges there-between. In a preferred embodiment, the alcohol-containing lipid (e.g., the blend of stearyl alcohol and cetyl alcohol), may be present in an amount ranging from about 4.0 to about 5.0 wt. % based on the total weight of the personal care composition—including all amounts and sub-ranges there-between. In some embodiments directed to improved smoothness, the alcohol-containing lipid is present in an amount of about 4.5 wt. % based on the total weight of the personal care composition. In some embodiments directed to improved foaming, the alcohol-containing lipid is present in an amount of about 4.5 wt. % based on the total weight of the personal care composition.

The compositions herein can contain a variety of other optional components suitable for rendering such compositions more cosmetically or aesthetically acceptable or to provide them with additional usage benefits. Such conventional optional ingredients are well-known to those skilled in the art, e.g., pearlescent aids, such as mica, mother of pearl, ethylene glycol distearate preservatives and pH adjusting agents, such as citric acid, benzoic acid, benzyl alcohol, sorbic acid, methyl paraben, propyl paraben and imidazolidinyl urea. The personal care composition may further comprise coloring agents, such as any of the FD&C or D&C dyes; anti-dandruff agents, such as zinc pyrithione, selenium sulfide, coal tar, salicylic acid; hair oxidizing (bleaching) agents, such as hydrogen peroxide, perborate and persulfate salts; hair reducing agents, such as the thioglycolates; perfumes; sequestering agents, such as disodium ethylenediamine tetra-acetate. Such optional ingredients generally are used individually at levels of from about 0.01% to about 10.0%, preferably from about 0.05% to about 5.0%, of the composition.

The personal care composition of the present invention may further comprise any conventional hair conditioning, film forming polycationic hair conditioning agents used in typical hair conditioning shampoo formulations which are soluble in the aqueous surfactant phase of the composition. Preferred examples are polyquaternium polymers. Exemplary examples of these agents are Polyquaternium-10, Polyquaternium-7, (e.g., Merquat-550) and mixtures thereof. Polyquaternium-10 is a salt of hydroxyethyl cellulose reacted with trimethylammonium substituted epoxide. Polyquaternium-7 is a chloride copolymer of acrylamide and dimethyldiallylammonium and its use is preferred. In certain embodiments, the polyquaternium is present in an amount of between about 0.1% to about 5%, about 1% to about 5%, about 1% to about 4%, or about 1% to about 3%, by weight of the personal care composition.

The personal care composition of the present invention has a turbidity useful for shampoo applications. In certain embodiments, the composition has a turbidity of between about 5 to about 15 NTU, about 5 to about 10 NTU, or about 6 to about 12 NTU.

The personal care composition of the present invention may be formed by adding together components of the surfactant system and the conditioning system, with optionally agitating the mixture as to mix the various components together without causing the blend to foam. In certain aspects, heat may be utilized during a mixing step.

The present invention is also directed to a method of treating, preventing or ameliorating a symptom associated with a disease, disorder or condition of a keratinous substance, comprising applying a personal care composition according to any one of the embodiments described herein to a keratinous substance of a subject in need thereof. In preferred embodiments of the method, the keratinous substance is hair. The method may further include rinsing the personal care composition from the keratinous substance to which it is applied.

The present invention is also directed to a method of cleansing a keratinous substance comprising applying a personal care composition according to any one of embodiments described to a keratinous substance of a subject in need thereof. The spreading of the personal care composition may be done by hand, or it may be done by an instrument such as a glove or a piece of cloth. In certain embodiments of the method, the keratinous substance is selected from: skin, hair; nails; and a combination of two or more thereof. In certain embodiments of the method, the method further comprises rinsing the keratinous substance to which the personal care composition was applied.

The method of applying the personal care composition may leave behind a film. The thickness of the film depends on other parts of the formulation, but for a lotion, the thickness will be comparable to the thicknesses of other lotions, body washes, or deodorants. For those embodiments wherein the personal care composition is a lotion, the thickness is about 50 μm.

In some embodiments, the present invention is also directed to a method of treating, preventing or ameliorating a symptom associated with a disease, disorder or condition of a keratinous substance, comprising applying a personal care composition according to any one of the embodiments described herein to a keratinous substance of a subject in need thereof. In some embodiments, the disease, disorder or condition of a keratinous substance is selected from: dandruff; dry scalp; and staining or damage caused by pollution.

The present invention is also directed to a method of cleansing a keratinous substance comprising applying a personal care composition according to any of the embodiments provided herein to a keratinous substance of a subject in need thereof. In certain embodiments, the keratinous substance is selected from: skin, hair, nails, and a combination of two or more thereof. In certain embodiments, the method further comprises rinsing the personal care composition from the keratinous substance to which it is applied.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

Example 1

Described below in Table 1 are exemplary personal care compositions of the present invention (examples 1-13).

TABLE 1

| Ingredient | 1 | 2 | 3 | 4 | 5 | 6 | 7 Wt. % | 8 | 9 | 10 | 11 | 12 | 13 |
|---|---|---|---|---|---|---|---|---|---|---|---|---|---|
| Water | 77.18 | 74.85 | 76.08 | 74.35 | 73.95 | 78.23 | 73.90 | 76.63 | 75.53 | 77.28 | 77.78 | 78.18 | 74.95 |
| Cationic Guar Gum | 0.20 | 0.20 | 0.15 | 0.20 | 0.10 | 0.15 | 0.15 | 0.10 | 0.20 | 0.10 | 0.10 | 0.20 | 0.10 |
| Cationic Conditioner | — | 3.33 | 1.65 | 3.33 | 3.33 | — | 3.33 | 1.65 | 1.65 | — | — | — | 3.33 |
| Anionic Surfactant | 14.29 | 14.29 | 14.29 | 14.29 | 14.29 | 14.29 | 14.29 | 14.29 | 14.29 | 14.29 | 14.29 | 14.29 | 14.29 |
| Amphoteric Surfactant | 3.28 | 3.28 | 3.28 | 3.28 | 3.28 | 3.28 | 3.28 | 3.28 | 3.28 | 3.28 | 3.28 | 3.28 | 3.28 |
| Nonionic Conditioner | 1.50 | 0.50 | 1.00 | 1.00 | 1.50 | 0.50 | 1.50 | 0.50 | 1.50 | 1.50 | 1.00 | 0.50 | 0.50 |
| Others | 3.56 | 3.56 | 3.56 | 3.56 | 3.56 | 3.56 | 3.56 | 3.56 | 3.56 | 3.56 | 3.56 | 3.56 | 3.56 |

Example 2

The turbidity of exemplary compositions of the present invention was evaluated. The results of these evaluations are described below in Table 2. The unit of measure for turbidity is the Nephelometric Turbidity Unit, NTU, and is based on formazin suspensions as standards. The range of turbidities detectable is 0.04 to 1,000 NTU's. Extremely turbid or highly colored solutions may produce high readings. Generally, a lower turbidity presents an optically clear solution, which is appealing to the consumer.

TABLE 2

|  | 1 | 2 | 3 | 4 | 5 | 6 | 7 | 8 | 9 | 10 | 11 | 12 | 13 |
|---|---|---|---|---|---|---|---|---|---|---|---|---|---|
| Turbidity (NTU) | 9.11 | 37.3 | 22.9 | 26.9 | 42.9 | 6.89 | 13.5 | 12.1 | 16.6 | 7.19 | 7.54 | 7.62 | 21.5 |

As illustrated by the data described in Table 2 (above), the present inventors have discovered a combination of a surfactant system and a conditioning system, which provides unexpected aesthetic and stability benefits to the product.

Example 3

The effects of alignment degree, wet combing and softness on hair tresses were evaluated for several exemplary compositions of the present invention. The results of these evaluations are described below in Table 3.

The alignment degree represents the amount of hair alignment observed. Generally, a higher alignment is associated with lower hair volume and enhanced aesthetic appeal.

For evaluation of the wet and dry combing tests, a wet combing test is used first followed by a dry combing test. For the wet combing test, a separate comb is used for each tress and coded to match the particular tress. The tresses are hung above a sink, trough or paper towels. The tresses are arranged in random order and kept wet (lightly dripping) with deionized water using a wash or trigger type squirt bottle. Trained evaluators are used to comb the tresses and assign a rank order with the highest number representing the easiest to comb. Using the fine teeth of the comb, judges comb the tresses, move them, and place them in descending order from easiest-to-hardest to comb. The tresses are then called ranked, and the order recorded. The judge then assigns a rating for each tress using their own subjective basis. Duplicate ratings are allowed on this scale. After the first judge has completed the process, the tresses are re-randomized and the process repeated. A minimum of 10 judges' evaluations are required if statistical results are expected. For dry combing evaluation, the process described for wet combing is repeated but with dry tresses (preferably air dried).

For the softness analysis, trained panelists evaluated tresses and organized the tresses in terms of hair softness, from lowest to highest degree of softness. The panelists assigned a grade to each tress that was based on the degree of softness, with a higher grade indicating a softer feeling. The grades for each treatment type were combined and the respective grades for the treatment types were compared with one another.

TABLE 3

|  | 1 | 2 | 3 | 4 | 5 | 6 | 7 | 8 | 9 | 10 | 11 | 12 | 13 |
|---|---|---|---|---|---|---|---|---|---|---|---|---|---|
| Alignment Degree | 20.5 | 22.28 | 18.64 | 19.9 | 18.51 | 23.68 | 21.79 | 23.5 | 19.9 | 20.86 | 19.09 | 24.38 | 19.03 |
| Wet Combing | 22 | 22 | 25 | 22 | 24 | 27 | 28 | 26 | 20 | 22 | 17 | 21 | 17 |
| Dry Combing | 26 | 27 | 23 | 27 | 29 | 29 | 29 | 28 | 26 | 27 | 23 | 26 | 27 |
| Softness | 20 | 19 | 20 | 20 | 21 | 22 | 22 | 22 | 20 | 17 | 19 | 22 | 20 |

As illustrated by the data described in Table 3 (above), the present inventors have discovered a combination of a surfactant system and a conditioning system, which provides a variety of unexpected benefits to hair.

Example 4

Three exemplary compositions of the present invention (Compositions 6, 7 and 8) were evaluated against three comparative formulas (Comp. Ex. I-Comp. Ex. III) for their performance in wet combing (FIG. 1), dry combing (FIG. 2), softness (FIG. 3) and hair alignment (FIG. 4). The ingredient listings for the Comp. Ex. I, Comp. Ex. II and Comp. Ex. III, which are all commercially available formulas, are provided below.

Comp. Ex. I: water, ammonium lauryl sulfate, sodium laureth sulfate, dimethiconol, cocamide MEA, glycol distearate, cocamidopropyl betaine, sodium chloride, perfume, sorbitol, guar hydroxypropyltrimonium, menthol, chloride, sodium phosphate, tetrasodium EDTA, citric acid, stearyl dimethicone PG-diethylammonium chloride, PEG-55 stearate, sodium benzoate, laureth-4, sodium salicylate, laureth-23, *Eucalyptus globulus*, and *Melaleuca alternifolia* (tea tree) leaf oil.

Comp. Ex. II: water, ammonium lauryl sulfate, ammonium laureth sulfate, dimethiconol, cocamide MEA, glycol distearate, glycerin, cocamidopropyl betaine, sodium chloride, perfume, sorbitol, guar hydroxypropyltrimonium chloride, sodium phosphate, tetrasodium EDTA, citric acid, disodium laureth sulfosuccinate, stearyl dimethicone PG-diethylmonium chloride, PEG-55 stearate, sodium benzoate, laureth-4, sodium salicylate, laureth-23, polyquaternium-6, methylisothiazolinone, aloe barbadensis extract, *citrus aurantium dulcis* fruit extract, *Citrus paradisi* fruit extract, *Pyrus malus* fruit extract, *Actinidia chinensis* fruit extract, tocopherol, linoleic acid, *Prunus amygdalus dulcis* fruit extract, and retinyl palmitate.

Comp. Ex. III: water, sodium laureth sulfate, sodium lauryl sulfate, cocamidopropyl betaine, citric acid, sodium citrate, sodium xylenesulfonate, fragrance/parfum, cocamide MEA, sodium chloride, sodium benzoate, tetrasodium EDTA, PEG-60 almond glycerides, guar hydroxypropyltrimonium chloride, linoleamidopropyl PG-dimonium chloride phosphate, panthenol, panthenyl ethyl ether, histidine, *Cucumis sativus*(cucumber) fruitwater, zeamays (corn) silk extract, *Citrus aurantium dulcis* (orange) flower extract, camelliasinensis leaf extract, and methylchloroisothiazolinone, methylisothiazolinone.

FIG. 1 shows that the inventive compositions perform within acceptable parameters for wet combing. All three inventive compositions (Compositions 6, 7 and 8) showed enhanced performance when compared to Comp. Ex. III.

Figure 2:
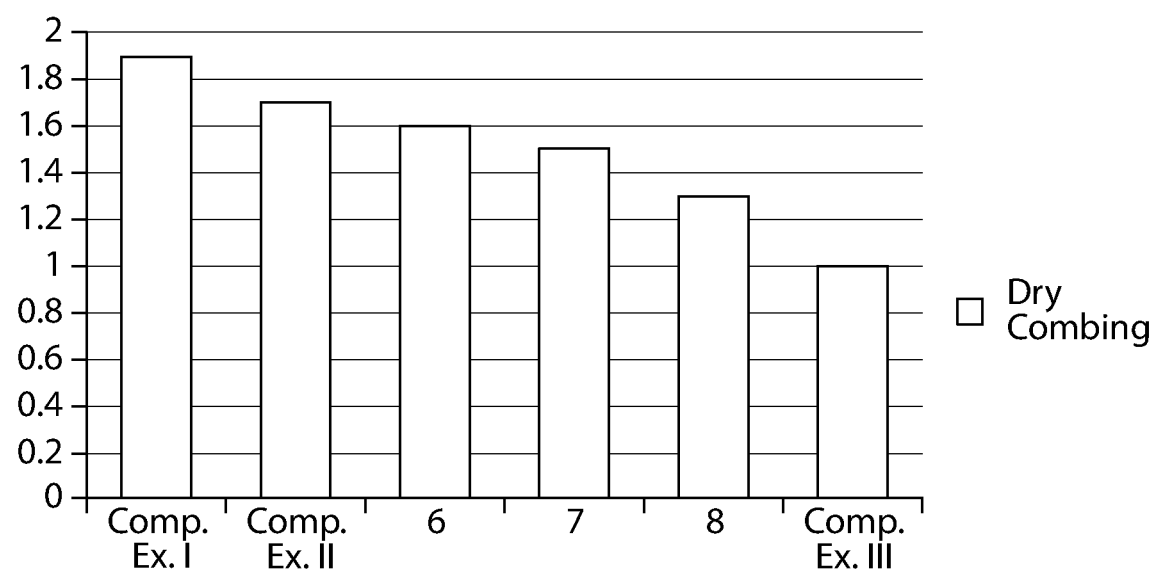
FIG. 2 depicts the performance on dry combing for compositions of the invention compared to comparative examples.

FIG. 2 shows that the inventive compositions perform within acceptable parameters for dry combing. All three inventive compositions (Compositions 6, 7 and 8) showed enhanced performance when compared to Comp. Ex. III.

Figure 3:
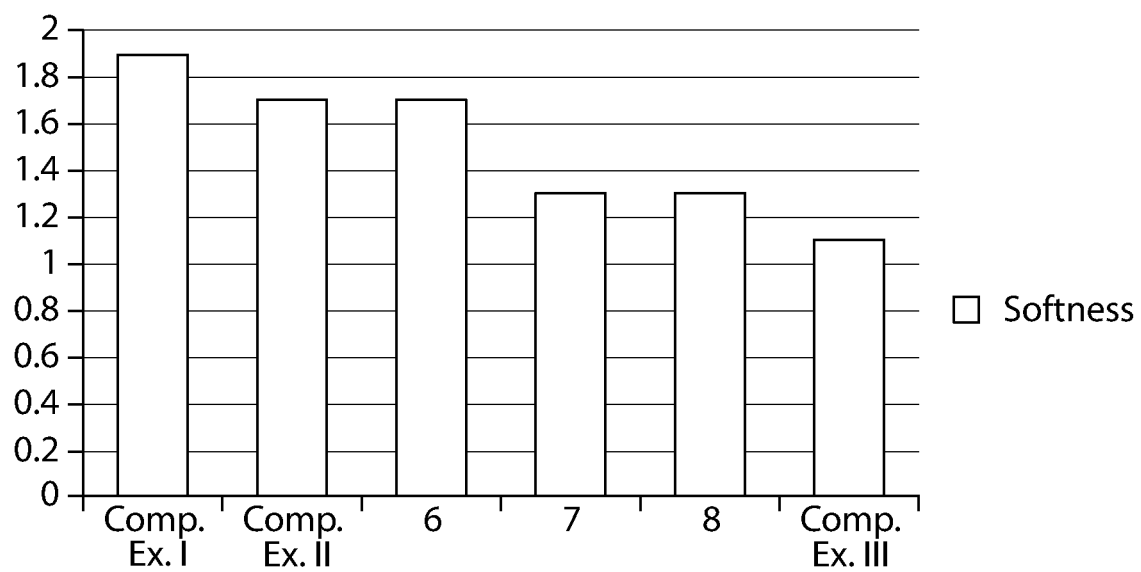
FIG. 3 depicts the performance on softness for compositions of the invention compared to comparative examples.
Figure 4:
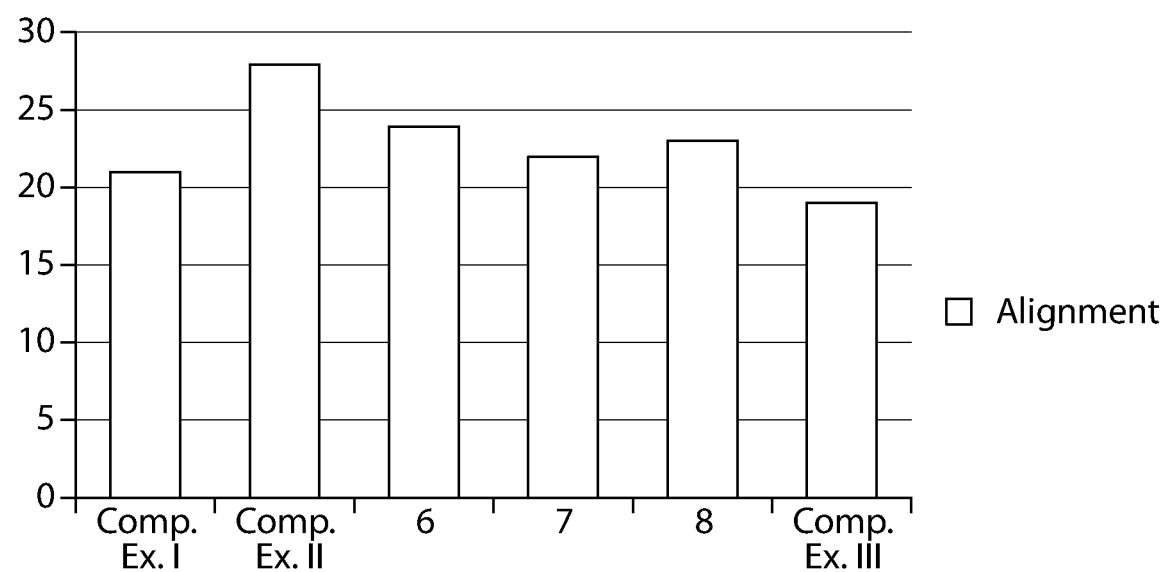
FIG. 4 depicts the performance on hair alignment for compositions of the invention compared to comparative examples.

FIG. 3 shows that the inventive compositions perform within acceptable parameters for softness. All three inventive compositions (Compositions 6, 7 and 8) showed enhanced performance when compared to Comp. Ex. III. FIG. 3 also shows that an exemplary composition of the present invention (Composition 6) provides surprisingly exceptional softness performance.

FIG. 4 shows that the inventive compositions perform within acceptable parameters for alignment. All three inventive compositions (Compositions 6, 7 and 8) showed enhanced performance when compared to Comp. Ex. I and Comp. Ex. III.

Shampoo formulations typically incorporate silicone ingredients, such as dimethiconol, as a way to improve the conditioning benefits to hair. Here, both Comp. Ex. I and Comp. Ex. II utilize silicones within their shampoo formulations. Surprisingly, the inventive compositions, which are silicone-free, performed with at least parity to these silicone containing compositions.

Example 5

Described below in Table 4 are suitable concentration ranges for exemplary personal care compositions of the present invention. It has been discovered that exemplary compositions of the present invention, encompassed by the formulations reported in Table 4, provide a clear shampoo composition with unexpected improvements in conditioning properties.

TABLE 4

| Ingredient | Wt. % |
| --- | --- |
| Water | 50-80 |
| Cationic Guar Gum | 0.050-5.0 |
| Anionic Surfactant | 10.00-20.00 |
| Amphoteric surfactant | 1.00-10.00 |
| Polypropylene alkyl ether | 0.050-5.00 |
| Others (Buffering Agent(s), Chelating Agent(s), Salt(s), Fragrance(s), Preservative(s) | Q.S. |
| Total | 100.00 |

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A personal care composition comprising:
a surfactant system comprising:
an anionic ether sulfate; and
an amphoteric surfactant; and
a conditioning system comprising:
a cationic guar gum; and
a polypropylene alkyl ether:
wherein the polypropylene alkyl ether is defined by the formula: $C_nH_{2n+1}[OCH(CH_3)CH_2]_xOH$;
wherein n is an integer from 1 to 12; and X is an integer from 2 to 40; and wherein the polypropylene alkyl ether is present in an amount between 0.05% to 3% by weight of the personal care composition.

2. The personal care composition according to claim 1, wherein the anionic ether sulfate is defined by the formula:

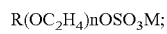

wherein R is an alkyl, alkylaryl, acyl, or alkenyl group having 8 to 18 carbon atoms;
n is 1 to 12, or 1 to 5; and
M is a solubilizing cation selected from sodium, potassium, ammonium, magnesium and mono-, di- and triethanol ammonium ions.

3. The personal care composition according to claim 1, wherein the anionic ether sulfate is selected from sodium laureth sulfate, sodium lauryl sulfate, ammonium lauryl sulfate, and a combination of two or more thereof.

4. The personal care composition according to claim 1, wherein the anionic ether sulfate is present in an amount between about 10% to about 20%, about 12% to about 18%, about 12% to about 16%, about 14%, or about 15%, by weight of the personal care composition.

5. The personal care composition according to claim 1, wherein the amphoteric surfactant is selected from: $C_{12-14}$ alkyl betaine; $C_{12-18}$ alkyl betaine; $C_{14-15}$ hydroxysulfo betaine; cocoamidopropyl betaine; cocoamidopropyl sultaine; lauroamphoglycinate; dihydroxyethyl tallow glycinate; isostearoamphopropionate; dodecyl betaine; tetradecyl betaine; hexadecyl betaine; sodium acylamphopropionate; disodium acyldiamphopropionate; sodium lauroamphoacetate; cocoamphodiacetate; $C_{12-18}$ alkylampho propionate; $C_{12}$ alkyliminodipropionate; and a combination of two or more thereof.

6. The personal care composition according to claim 1, wherein the amphoteric surfactant is present in an amount between about 1% to about 10%, about 2% to about 8%, about 2% to about 5%, or about 2% to about 4%, by weight of the personal care composition.

7. The personal care composition according to claim 1, wherein the surfactant system is present in an amount between about 11% to about 22%, about 13% to about 20%, or about 15% to about 18%, by weight of the personal care composition.

8. The personal care composition according to claim 1, wherein the cationic guar gum is derivatized with a quaternary ammonium group defined by the formula:

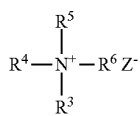

wherein $R^3$, $R^4$ and $R^5$ are selected from hydrogen, alkyl, hydroxyalkyl, epoxy alkyl, alkenyl, or aryl;

$R^6$ is either an epoxyalkyl group of the general formula:

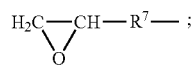

or $R^6$ is a halohydrin group of the general formula:

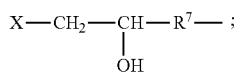

wherein $R^7$ is a $C_{1-3}$ alkylene;

X is chlorine or bromine, and

Z is an anion such as Cl-, Br-, I- or HSO4-.

9. The personal care composition according to claim 1, wherein the cationic guar gum is present in an amount between about 0.05% to about 5%, about 0.05% to about 3%, about 0.1% to about 2%, or about 0.1% to about 1%, by weight of the personal care composition.

10. The personal care composition according to claim 1, wherein the polypropylene alkyl ether is present in an amount between about 0.1% to about 2% by weight of the personal care composition.

11. The personal care composition according to claim 10, wherein the polypropylene alkyl ether is present in an amount between about 0.1% to about 1%, by weight of the personal care composition.

12. The personal care composition according to claim 1, wherein the conditioning system is present in an amount between about 0.1% to about 3%, about 0.1% to about 2%, or about 0.1% to about 1%, by weight of the personal care composition.

13. The personal care composition according to claim 1, wherein the composition is in the form of a shampoo.

14. The personal care composition according to claim 1, wherein the composition further comprises polyquaternium-7.

15. The personal care composition according to claim 14, wherein the polyquaternium-7 is present in an amount of between about 0.1% to about 5%, about 1% to about 5%, about 1% to about 4%, or about 1% to about 3%, by weight of the personal care composition.

16. The personal care composition according to claim 1, wherein the composition has a turbidity of between about 5 to about 15 NTU, about 5 to about 10 NTU, or about 6 to about 12 NTU.

17. A method of treating, preventing or ameliorating a symptom associated with a disease, disorder or condition of a keratinous substance, comprising applying a personal care composition according to claim 1 to a keratinous substance of a subject in need thereof.

18. A method of cleansing a keratinous substance comprising applying a personal care composition according to claim 1 to a keratinous substance of a subject in need thereof.

19. The method according to claim 17, wherein the keratinous substance is hair.

20. The method according to claim 17, further comprising rinsing the personal care composition from the keratinous substance to which it is applied.

* * * * *